US 8,452,949 B1

(12) United States Patent
Streuter et al.

(10) Patent No.: US 8,452,949 B1
(45) Date of Patent: May 28, 2013

(54) OPTICAL BOOT TO ELIMINATE CHANGING BIOS TO BOOT EXTERNALLY ATTACHED STORAGE DEVICE

(75) Inventors: Gary Streuter, San Clemente, CA (US); Randall Deetz, Costa Mesa, CA (US); James Sedin, Ketchum, ID (US)

(73) Assignee: CMS Products, Inc., Costa Mesa, CA (US)

( * ) Notice: Subject to any disclaimer, the term of this patent is extended or adjusted under 35 U.S.C. 154(b) by 286 days.

(21) Appl. No.: 12/785,438

(22) Filed: May 22, 2010

Related U.S. Application Data

(60) Provisional application No. 61/182,031, filed on May 28, 2009.

(51) Int. Cl.
  G06F 9/24 (2006.01)
  G06F 15/177 (2006.01)
(52) U.S. Cl.
  USPC .................................................. 713/1; 713/2
(58) Field of Classification Search
  USPC ......................................................... 713/1, 2
  See application file for complete search history.

(56) References Cited

U.S. PATENT DOCUMENTS

| | | | | |
|---|---|---|---|---|
| 7,757,112 B2 * | 7/2010 | Childs et al. | ............... | 714/5.1 |
| 7,979,690 B1 * | 7/2011 | Dyatlov et al. | ............... | 713/2 |
| 8,028,155 B1 * | 9/2011 | Righi et al. | ............... | 713/2 |
| 8,140,836 B2 * | 3/2012 | Ogawa et al. | ............... | 713/1 |
| 2003/0051127 A1 * | 3/2003 | Miwa | ............... | 713/2 |
| 2004/0162974 A1 * | 8/2004 | Angelo et al. | ............... | 713/1 |
| 2005/0193189 A1 * | 9/2005 | Kim | ............... | 713/1 |
| 2007/0061559 A1 * | 3/2007 | Kwon et al. | ............... | 713/1 |

* cited by examiner

*Primary Examiner* — Kim Huynh
*Assistant Examiner* — Zahid Choudhury
(74) *Attorney, Agent, or Firm* — Law Office of Scott C. Harris, Inc.

(57) ABSTRACT

Booting an operating system from an externally attached storage device without forcing the user to change the boot order in the BIOS of a personal computer. The computer is booted from either an internal or external drive with removable media. A program that is resident on the removable media scans the computer system for any attached storage device with a bootable operating system. The user is shown a list of partitions on all attached devices with bootable operating systems and a user is prompted to pick one of the operating systems to boot. The software program then loads the boot loader from the master boot record of the selected partition and transfers control of the microprocessor to the boot loader allowing it to complete the boot sequence.

9 Claims, 4 Drawing Sheets

OPTICAL BOOT TO ELIMINATE CHANGING BIOS TO BOOT EXTERNALLY ATTACHED STORAGE DEVICE

This application claims priority from provisional application No. 61/182,031, filed May 28, 2009, the entire contents of which are herewith incorporated by reference.

BACKGROUND

Backup and recovery software is well known in the art. Many software packages will create non-bootable backup images of system drives and bootable images of system drives. Those software packages that create non-bootable images of system drives generally use a bootable operating system residing on a CD or DVD. Also generally, these bootable operating systems are Linux based and also include an application that will restore software programs from the backup to the system drive. The software program will typically create a bootable drive on the old system drive or will create a bootable drive on a new fresh raw system drive and then transfer the image from the externally attached drive to the system drive.

The second type of backup software package will create a bootable image of the system drive that is capable of being booted over an external bus such as USB or 1394. This latter technique generally requires the user to change the boot order of the system BIOS or requires the software to change the settings of the system BIOS.

This generally creates two possible problems. The first is that the average user cannot or will not change the boot settings of the system BIOS, because doing so can be an intimidating task at best. Most IT departments of large companies have policies prohibiting the user from actually gaining access to the system BIOS. A second problem is that the system BIOS is generally different from one model computer to the next and one general purpose software module can never stay up to day with all of the possible system BIOS modules.

SUMMARY

The inventors recognize certain issues related to users modifying the system BIOS so as to allow an externally connected storage device to be booted.

Embodiments described herein allow the user to boot and run an operating system and application software from the backup copy of a system drive.

DESCRIPTION OF THE DRAWINGS

Embodiments of the present invention are illustrated by way of example, and not by way of limitation. The following figures and the descriptions both brief and the detailed descriptions of the invention refer to similar elements and in which.

DETAILED DESCRIPTION

Windows operating systems (Windows 95, Windows 2000, Windows ME, Windows NT, Windows XP, Windows Vista, Windows 7 and Windows Server) all make use of a master boot record on bootable storage devices such as magnetic rotating hard disk drives.

Figure 1:
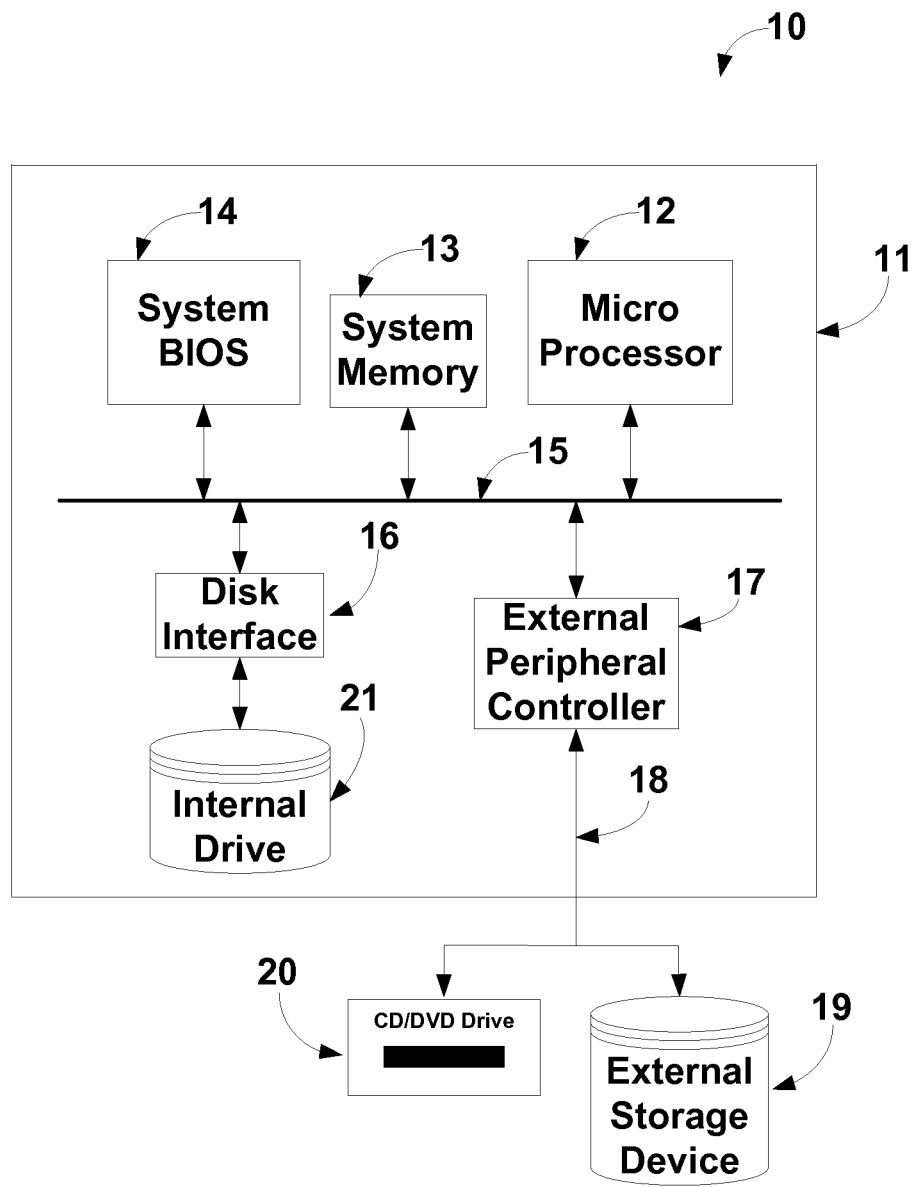
FIG. 1 is a depiction of a personal computer or server on a removable media residing in CD/DVD Drive 20.
Figure 2:
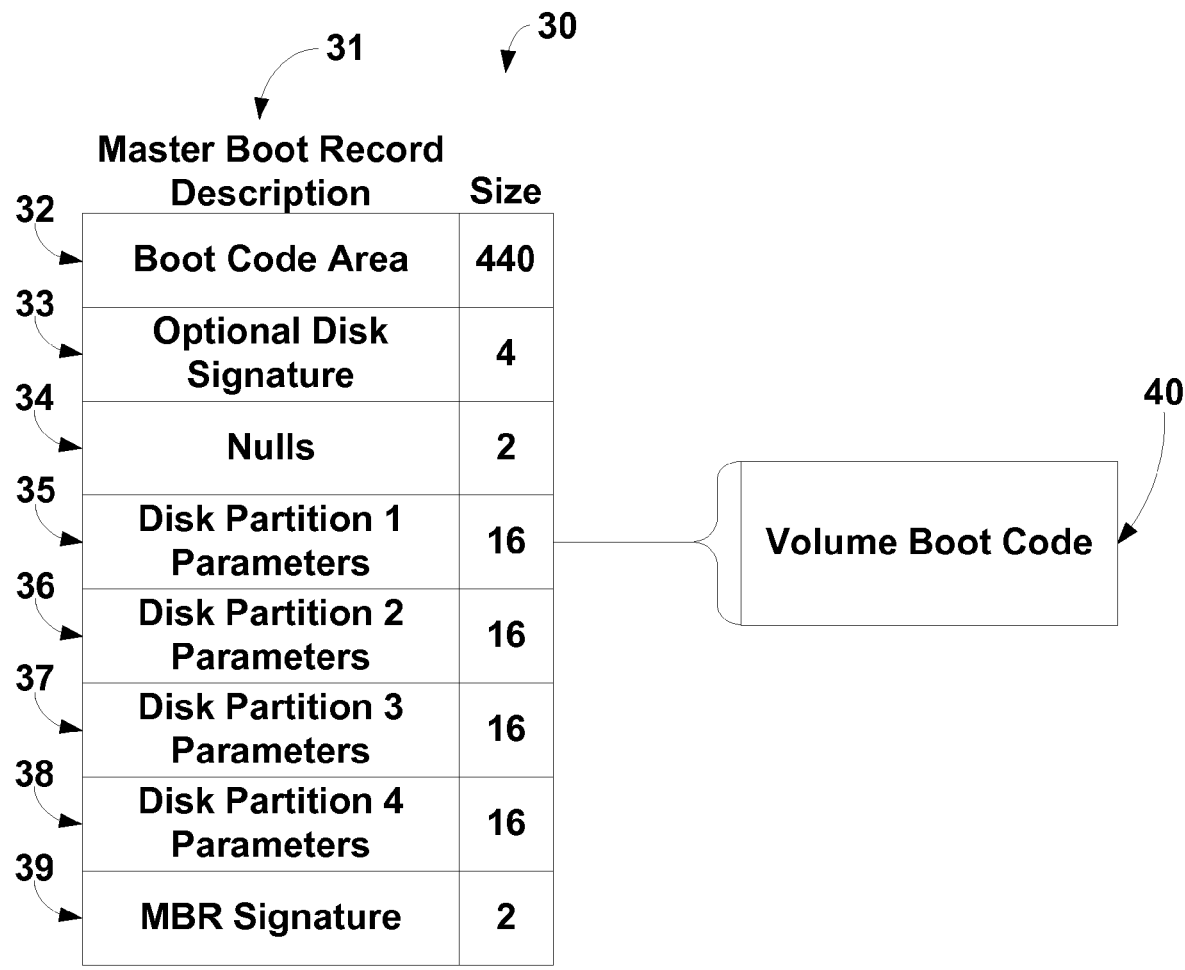
FIG. 2 is a depiction of a typical master boot record that would reside on a storage device containing a bootable windows operating system.

Element 30 in FIG. 2 is a depiction of a master boot record 31 that would be found on a storage device used for a windows operating system. The master boot record 31 resides on a sector that is 512 bytes in length. The master boot record 31 is depicted as two columns where the first column contains a description of a field and column two is a decimal number representing the length of the field. Thus, in depiction 30, master boot record 31 is shown as having 8 fields (represented as rows). The first field in master boot record 31 is boot code area 32. This field contains a small (440 bytes in length) computer software program that can read the volume boot record for the active or primary partition of the storage device.

By convention, there are exactly four primary partition table entries in the Windows Master Boot Record Partition Table scheme. If a windows storage device only contains a single partition, then only disk partition 1 parameters 35 will contain valid information.

Another embodiment operates using a different format of the master boot record table, and/or any file that operates in a comparable way to provide information that can be used to be read to partitions of a storage device.

Figure 3:
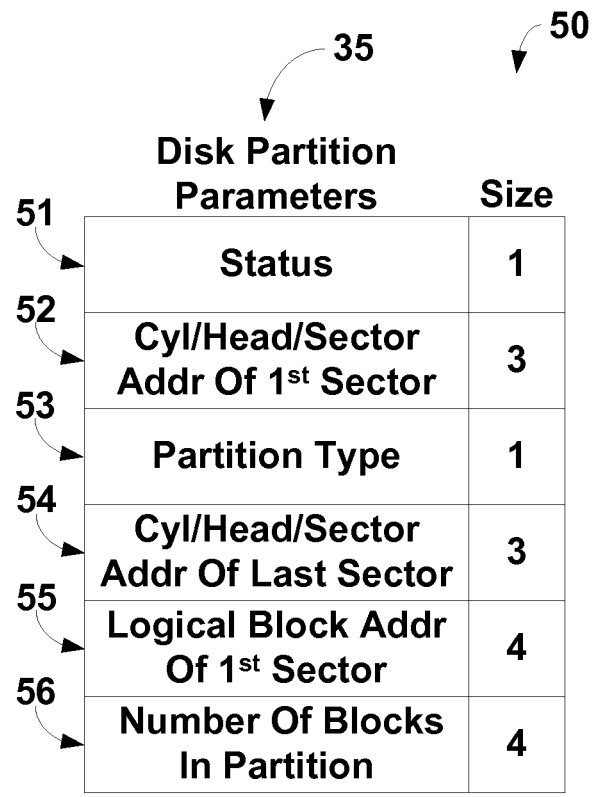
FIG. 3 is a depiction of a typical disk partition parameter block which points to one of four possible partitions that may reside on a typical windows storage device.

FIG. 3 depicts a more detailed view of disk partition 1 parameters 35. In FIG. 3, the length of the partition shown as number of blocks in partition 56, and the partition start address shown as logical block address of 1st sector 55, are stored as 32-bit (4 byte) quantities. Status 51 is one byte in length and contains one of two valid values which are 0x80 (indicates that the partition is bootable) or 0x00 which indicates that the partition is not bootable.

This table 35 represents the data that is in one of the memories, and the table itself would not be formed in this way within the memory.

A storage device may be subdivided into separate logical devices typically referred to as partitions. Master boot record 31 is shown with 4 partitions defined as disk partition 1 parameters 35, disk partition 2 parameters 36, disk partition 3 parameters 37, and disk partition 4 parameters 38. In FIG. 2 disk partition 1 parameters 35 point to volume boot code 40 which resides as the first sector of partition 1. The volume boot code is a type of boot sector, stored in the first sector of a bootable partition on a storage device and consists of additional code for loading the operating system stored in other parts of the storage device.

Figure 4:
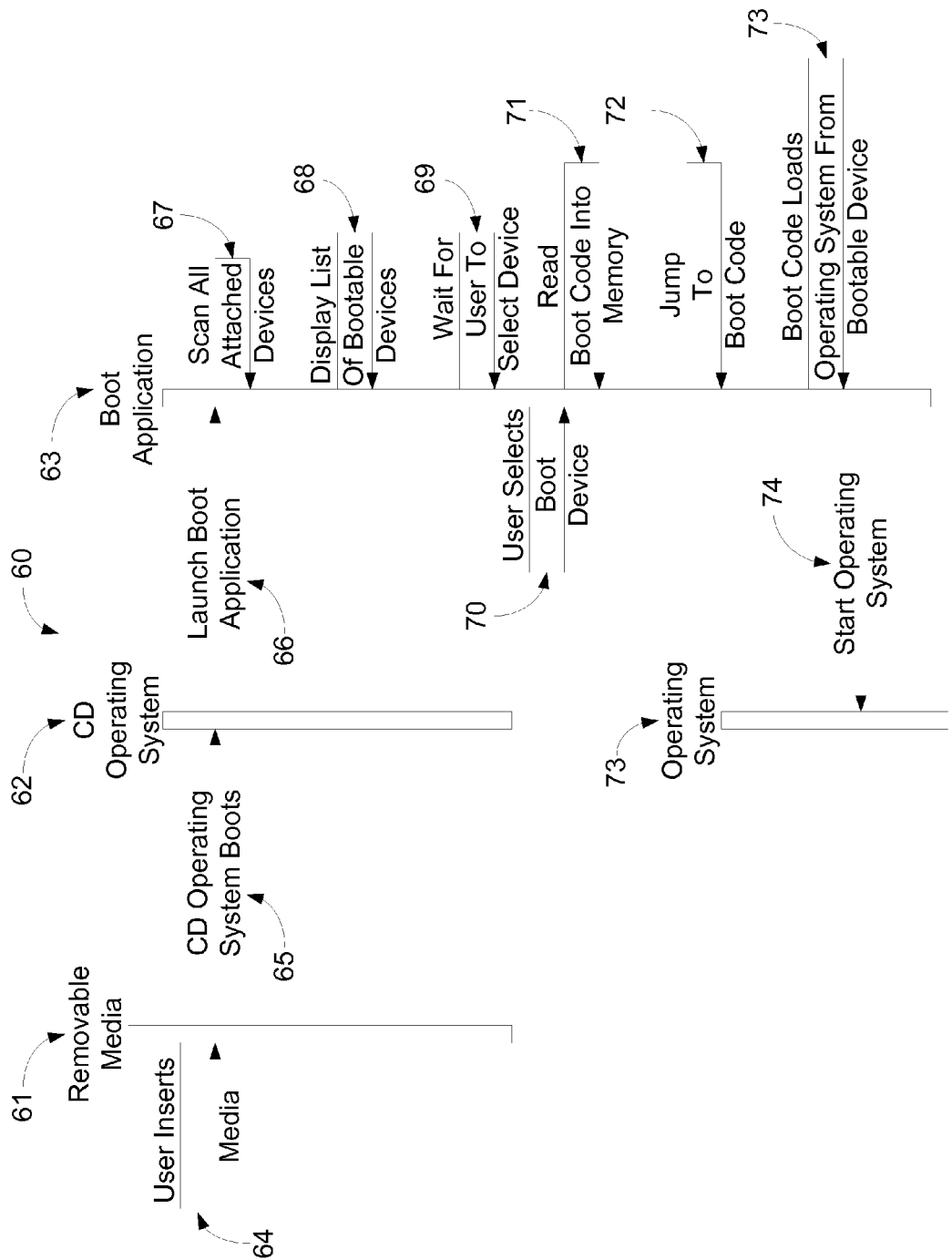
FIG. 4 is a UML sequence diagram showing logic from a time when a piece of removable media with an embodiment is inserted into a CD/DVD drive and the embodiment boots the operating system residing on an attached storage device.

FIG. 4 shows a UML sequence diagram showing the components and the logic flow of an embodiment. UML diagram 60 begins when the user inserts media 64. Removable media 61 contains the alternate bootable operating system, typically Unix. The action of removable media 61 being inserted into CD/DVD drive 20 is detected by system bios 14 which boot CD operating system 62. Once CD operating system 62 is booted, it will automatically launch boot application 66 which reads boot application 63 off of the removable media into system memory 13 and starts it executing.

Boot application 63 will execute scan all attached storage devices 67 which examines the master boot record 31 of each attached external storage device 19. Boot application 63 retains the ID of each bootable partition on each attached external storage device 19. Once boot application 63 has scanned all attached external storage devices 19, it displays a list of bootable devices 68 and then waits for the user to select device 69.

Once user selects boot device 70 occurs, boot application 63 reads boot code into memory 71. In the current embodiment, this action reads volume boot code 40 which is sector 1 of partition 1 pointed to by disk partition 1 parameters 35 into system memory 13. Boot application 63 then executes a jump to boot code 72. This action causes processor 12 to begin executing the first instruction of code contained in volume boot code 40. This code, or software program, executes boot code to load operating system from bootable device 73. The operating system will now be loaded the same as if system bios 14 had read boot code area from master boot record 31 and initiated the boot sequence. The operating system contained on attached external storage device 19 will be loaded and started by the invention which allows the user access to his data and to his application software programs.

At this point the user may elect to continue running with the operating system contained on attached external storage device 19 or may launch some backup or restore software application that will rebuild internal drive 21 and transfer the contents of attached external storage device to internal drive 21 making it bootable. The user may also elect to replace internal drive 21 with a fresh raw drive and then rebuild it and transfer the contents of attached external storage device to internal drive 21 making it bootable.

In one embodiment, micro processor 12 examines a first sector of the storage device to determine if the first sector contains a valid operating system by looking for specified values in said first sector. For example, micro processor 12 may investigate for a value of 55h and AAh at locations 510 and 511 decimal. This indicates that the storage device contains a valid operating system. This causes it to be shown in the list of all bootable storage devices. Once shown, the first software program will read the 440 bytes of software code from the first sector of the selected storage device into the system RAM memory then the software program will transfer control of micro processor 12 to the software code which will initiate the boot.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other kinds of computers with other file systems can be used, and other programs and other processes of determining file changes can be used.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the embodiment. For example, a hardware implementation of the processes of determining file updates and changes can be used.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present embodiment. Various modifications to these exemplary embodiments will be readily apparent to those skilled in the art, and the generic principles defined herein may be applied to other embodiments without departing from the spirit or scope of the embodiment. Thus, the present embodiment is not intended to be limited to the embodiments shown herein but is to be accorded the widest scope consistent with the principles and novel features disclosed herein.

Equivalent elements can be substituted for the ones set forth above such that they perform in substantially the same manner in substantially the same way for achieving substantially the same result.

What is claimed is:

1. A system for booting a personal computer from alternate storage devices comprising:
   a personal computer;
   a first removable media device having a first port that is connectable to the personal computer to allow said first removable media device to be removed and connected via connection via said first port, said first removable media device containing computer readable instructions including:
   a bootable operating system;
   at least a first software program with a user interface;
   said bootable operating system after being booted by said personal computer operating to launch said first software program:
   said first software program executed by said personal computer to:
      scan all storage devices contained within said personal computer or attached to said personal computer,
      examine a first sector of each storage device to determine if said first sector contains a valid operating system by looking for specified values in said first sector, and create a list of all bootable partitions found on any of said storage devices and,
      after said list is created, displaying said list of all bootable partitions found on any of said storage devices and soliciting from a user the operating system to be booted on the user interface;
   receive a selection from said user of an operating system to be booted, and using said selection to determine a selected master boot record for a selected operating system, and reading a volume boot code from the selected master boot record for the selected operating system into memory and cause said personal computer to begin executing the volume boot code thereby starting a boot sequence for the selected operating system.

2. The system of claim 1 where said first removable media device is one of a rotating magnetic hard disk drive;
   rotating rewritable optical disk drive with fixed media or removable media;
   compact flash memory drive;
   USB flash memory drive;
   MicroSD flash memory drive; or
   a solid-state drive.

3. The system of claim 1, wherein said first software program examines a first sector of the said storage device to determine if said first sector contains a valid operating system by looking for specified values in said first sector.

4. The system of claim 3, wherein said specified values are values of 55h and AAh at locations 510 and 511 decimal, to indicate that the said storage device contains a valid operating system.

5. The system of claim 3, wherein said booting comprises reading software code from the said first sector of a selected storage device and transferring control of said personal computer which executes a boot operation.

6. A method to boot an attached storage device attached to a personal computer comprising:
   using an operating system executable by the personal computer;
   storing a copy of said operating system on the attached storage device;
   allowing selection of said attached storage device as a boot device by said personal computer when a normal boot device of said personal computer fails during a normal boot sequence and responsive to said selection, booting said personal computer from said operating system on said attached storage device;
   automatically executing a first software program after said personal computer boots said operating system from said attached storage device;
   said first software program executed to:
      search all storage devices attached to said personal computer;

for each storage device found by said search, examining a first sector of said storage device to determine if said first sector contains a valid operating system by looking for specified hexadecimal values of 55h and AAh at decimal locations 510 and 511 of said first sector, to indicate that said storage device contains a valid operating system;

if any of said storage device has a valid operating system, then said first software program is executed to save an identification of said storage device in a list of all bootable storage devices;

displaying a list of all bootable storage devices attached to said personal computer and prompting to select one of said attached storage devices; and responsive to a user selecting one of said attached storage devices, booting from said device.

7. A method as in claim 6, wherein said booting comprises reading a volume boot code loader from said first sector of a selected storage device and transferring control of said personal computer which executes a boot operation.

8. A computer program product, comprising a computer usable non-transitory medium having a computer readable program code embodied therein, said computer readable program code adapted to be executed to implement a method for booting an attached storage device attached to a personal computer, said method comprising:

using an operating system executable by said personal computer;

storing a copy of said operating system on the attached storage device;

allowing selection of said attached storage device as a boot device when an internal storage device fails during a normal boot sequence and responsive to said selection, booting said personal computer from said operating system on said attached storage device;

automatically searching for storage devices attached to said personal computer after said personal computer boots said operating system from said attached storage device;

for each storage device found by said searching, examining a first sector of the said storage device to determine of said first sector contains valid hexadecimal data of values 55h and AAh at decimal location 510 and 511 indicating that said storage device contains a valid operating system;

if the said storage device has a valid operating system, then saving an identification of said storage device in a list of all bootable storage devices;

displaying a list of all bootable storage devices;

prompting to select one of said attached storage devices; and responsive to selecting one of said attached storage devices, booting from said device.

9. A product as in claim 8, wherein said booting comprises reading software code from the said first sector of a selected storage device and transferring control of said personal computer which executes a boot operation.

* * * * *